United States Patent [19]
Kodera et al.

[11] 3,856,925
[45] Dec. 24, 1974

[54] METHOD FOR MANUFACTURE OF HYDROGEN AND CARBONYL SULFIDE FROM HYDROGEN SULFIDE AND CARBON MONOXIDE

[75] Inventors: Yoshihide Kodera, Kanagawa; Naoyuki Todo; Kenzo Fukuda, both of Saitama, all of Japan

[73] Assignee: Agency of Industrial Science & Technology, Tokyo, Japan

[22] Filed: Aug. 17, 1972

[21] Appl. No.: 281,409

[30] Foreign Application Priority Data
Aug. 19, 1971 Japan................. 46-62574

[52] U.S. Cl.................. 423/416, 423/573, 423/648
[51] Int. Cl. ........................ C01b 31/26, C01b 1/03
[58] Field of Search ........... 423/415, 416, 573, 574, 423/648

[56] References Cited
UNITED STATES PATENTS 2,979,384   4/1961   Weiner et al. ................. 423/573
3,416,893   12/1968  Parish et al. .................. 423/416

FOREIGN PATENTS OR APPLICATIONS
120,554   9/1918   Great Britain .................. 423/573

*Primary Examiner*—Earl C. Thomas
*Attorney, Agent, or Firm*—Kurt Kelman

[57] ABSTRACT

Hydrogen is produced from hydrogen sulfide by using, as a catalyst, the sulfide of a metal selected from the class consisting of transition metals of Group V such as vanadium, of Group IV such as molybdenum, tungsten and chromium and of group VIII such as iron, cobalt, nickel, palladium and rhodium of the Periodic Table of the Elements. When hydrogen sulfide is supplied to a reaction system using therein the said catalyst, it is separated into hydrogen and sulfur and the sulfur thus separated is deposited and accumulated on the catalyst. Regeneration of the catalyst is accomplished by causing carbon monoxide or nitrogen monoxide to react on the deposited sulfur so that the sulfur is removed from the catalyst in the form of carbonyl sulfide or nitrogen oxysulfide.

3 Claims, 1 Drawing Figure

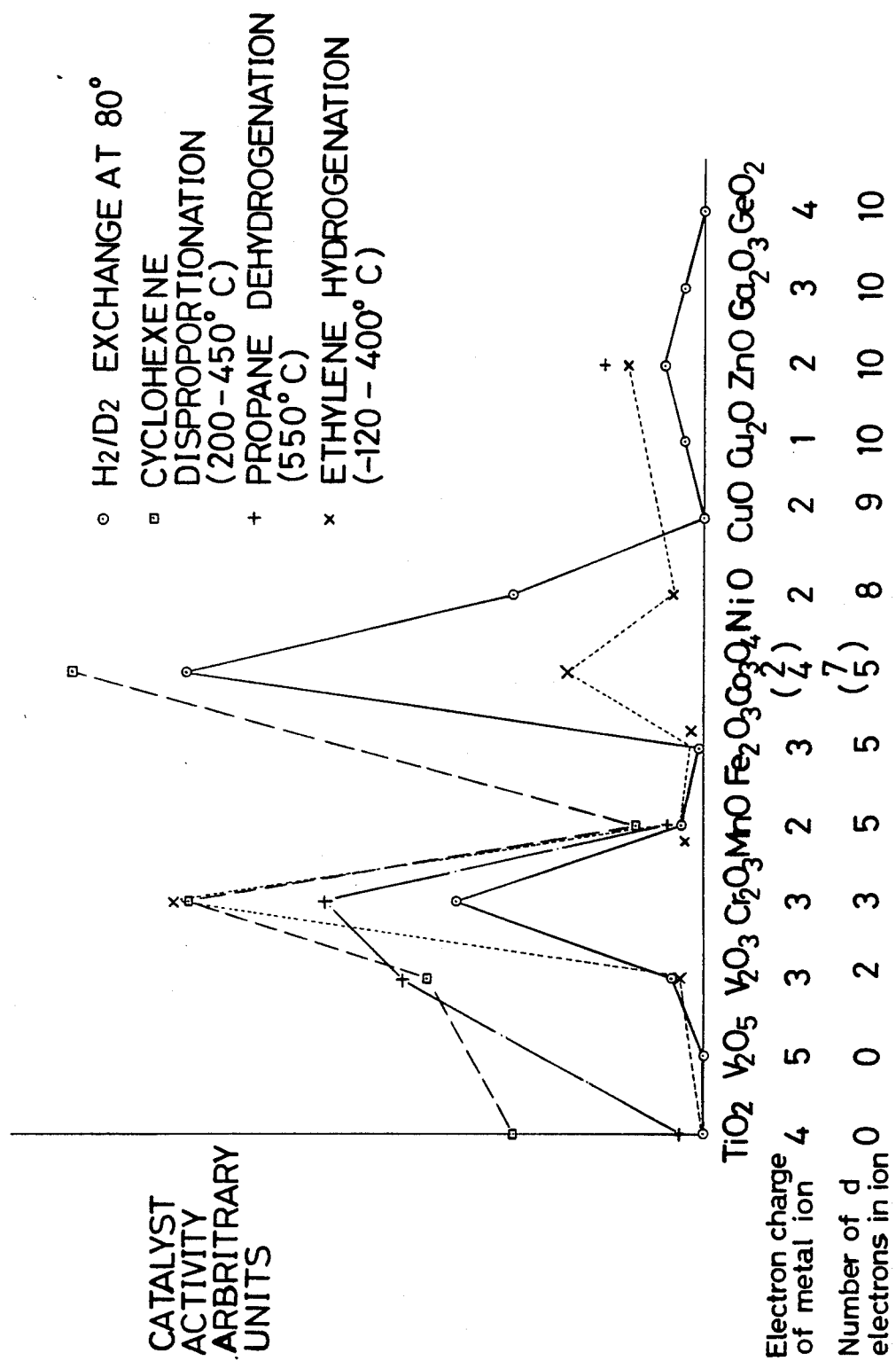

METHOD FOR MANUFACTURE OF HYDROGEN AND CARBONYL SULFIDE FROM HYDROGEN SULFIDE AND CARBON MONOXIDE

This invention relates to a method for the manufacture of hydrogen by the decomposition reaction of hydrogen sulfide.

A considerable amount of hydrogen sulfide occurs as a by-product in petroleum refining processes utilizing hydrogen gas, such as processes for desulfurization of crude oil and heavy oil and those for desulfurization of various petroleum fractions by means of hydrocracking. There is every indication that the total amount of hydrogen sulfide thus formed will increase year after year in consequence of the constant increase in the size of petroleum refining equipment and in the volume of petroleum consumption. In the existing petroleum refining processes, this by-product hydrogen sulfide is generally withdrawn from the reaction system in the form of off gas in conjunction with other inflammable gases. The inflammable off gas is generally used as fuel mainly for combustion in furnaces. If the hydrogen sulfide content of the off gas is high, the sulfur dioxide gas content of the waste gas resulting from the combustion of the off gas will increase to an extent of creating environmental pollution. To preclude this problem, the off gas is generally stripped of hydrogen sulfide by suitable treatments. There has been a real need for a method whereby the hydrogen sulfide thus separated can be converted into some other valuable substances.

For effective utilization of hydrogen sulfide which occurs as a by-product, there have heretofore been proposed several methods. Among these methods, what is called the Claus Process or the modified Claus Process is about the only method which has any commercial significance at all. This process comprises separating hydrogen sulfide from the off gas, concentrating the separated hydrogen sulfide and subjecting it to a partial oxidation treatment so as to convert it into elemental sulfur and water. The reactions involved in this process are shown by the following formulas.

| $H_2S + 3/2O_2$ | → | $H_2O + SO_2$ |
|---|---|---|
| $2H_2S + SO_2$ | → | $2H_2O + 3S$ |
| $3H_2S + 3/2O_2$ | → | $3H_2O + 3S$ |

This method, if evaluated in terms of effective utilization of hydrogen sulfide, cannot be regarded as fully satisfactory. The reason is that, in this method, the sulfur atom present in the hydrogen sulfide molecule is alone recovered in the form of elemental sulfur and the hydrogen atoms contained in the molecule are discarded in the form of water. Thus, the hydrogen atoms which are available are wasted without being put to any effective use at all. In the case of desulfurization of crude oil or heavy oil by hydrocracking, the ratio of the cost of hydrogen to the whole cost of operation is exceptionally high. The high cost of hydrogen, together with the cost of catalyst, therefore constitutes one of the major factors that have the largest effects on the economy of the desulfurization process. If the aforementioned Claus Process or modified Claus Process is reviewed from this point, the partial oxidation to be effected in accordance with this process upon the by-product hydrogen sulfide originating in the desulfurization process proves to be highly disadvantageous in terms of the economy of process. This is because the said partial oxidation has effect equal to permitting a part of the hydrogen gas used for desulfurization to be discarded eventually in the form of water via hydrogen sulfide as the intermediate.

The main object of this invention is to provide a method for easily separating hydrogen and sulfur from hydrogen sulfide.

Another object of the present invention is to provide a method for separating hydrogen sulfide into hydrogen and sulfur by a decomposition reaction of a relatively low temperature.

Other objects and characteristics of the present invention are now described in further depth with reference to the accompanying drawings.

The drawing attached hereto represents a graph illustrating the twin peak activity pattern of the catalysts composed of oxides of transition metals.

The inventors pursued devoted research on the effective utilization of hydrogen sulfide while taking into consideration the technical background mentioned above. As a result, they have discovered that hydrogen sulfide is relatively easily decomposed into hydrogen and sulfur when the decomposition is carried out in the presence, as a catalyst, of the sulfide of a metal selected from the class of metals of Group V, Group VI and Group VIII of the Periodic Table of the Elements.

The catalysts which are desirably used for the purpose of this invention are those made of the sulfides of metals such as vanadium of Group V, molybdenum, tungsten and chromium of Group VI and cobalt, nickel, platinum, palladium and rhodium of Group VIII respectively of the Periodic Table of the Elements.

The sulfides of these metals serve to catalyze the separation of hydrogen sulfide into hydrogen and sulfur. This catalysis can logically be explained by postulating the following theoretical background.

Various metal oxides are known to exhibit catalytic activities in the disproportionation reaction of cyclohexene, the dehydrogenation reaction of propane, the hydrogen-heavy hydrogen exchange reaction, etc. The catalytic activities have been found to rank in the order of the twin-peak pattern as illustrated in the attached drawing with reference to the number of d electrons contained in metal ions which are constituents of the corresponding metal oxides (D. A. Dowden: Catalysis Review, 5, 1 (1971)). This order of activities agrees fairly well with the order of the energies which are generated to stabilized d electrons of metal ions at the time that reactant gases are adsorbed to the metal ions exposed on the surface of corresponding metal oxides. When such stabilization energies are theoretically estimated on the basis of crystal field theory, it is found that metal ions having 3 and 8 d electrons have the largest stabilization energies and that the stabilization energies are smallest where the numbers of d electrons are 0, 5 and 10. Metal ions having other numbers of d electrons have stabilization energies of intermediate values.

It is, accordingly, concluded that the catalytic activity of a given metal oxide is closely related with the number of d electrons in the metal ion which is a constituent of that metal oxide.

The results of the inventors' study on catalysts also reveal that manganese sulfide, copper sulfide and zinc sulfide which have respectively 5, 10 and 10 d electrons have substantially no ability to decompose hydrogen sulfide, while cobalt sulfide and nickel sulfide exhibit excellent catalytic activities. These results strongly suggest that also in the case of metal sulfides, the same interrelation as observed with metal oxides exists between the number of d electrons in the metal ion of a given metal sulfide and the catalytic activity of that metal sulfide.

From the preceding point of view, it can easily be inferred that when sulfides of metals are employed to accomplish the decomposition of hydrogen sulfide into hydrogen and sulfur, those metal sulfides which contain 1, 2, 3, 4, 6, 7, 8 and 9 d electrons in their metal ion constituents are effective. Metals which produce such effective sulfides are the transition metals belonging to the transition metals of Group V, Group VI and Group VIII of the Periodic Table of the Elements.

These metal sulfides can be used by themselves for the purpose of catalysis under review or they may be deposited on suitable carriers. They may also be combined with suitable adjuvants.

These catalysts suffice for the present purpose so long as they assume the form of sulfides while the reaction is in progress. It is, therefore, permissible to use such a catalyst in the form of metal oxide at the time of packing a given reaction device and convert the metal oxide into a corresponding sulfide by the use of hydrogen sulfide before the start of the decomposition reaction contemplated by this invention.

When hydrogen sulfide is supplied to the reaction device packed with such catalyst, while the catalyst is maintained at a temperature below 500°C, sulfur is deposited on the catalyst and hydrogen alone is liberated. The liberated hydrogen can be recovered by a suitable method. Thus, hydrogen sulfide can easily be divided into sulfur and hydrogen. The accumulation of sulfur on the catalyst proceeds and reaches a point where the activity of that catalyst is lowered after a fixed amount of hydrogen sulfide has been treated. The catalyst thus deteriorated in activity can be regenerated by liberating the sulfur deposited on the catalyst and discharging the liberated sulfur from the reaction device. For the purpose of this liberation of sulfur, a substance such as carbon monoxide or nitrogen monoxide which exhibits strong reactivity with sulfur is supplied to the elemental sulflur adhering to the catalyst so that the sulfur will be liberated from the catalyst in the form of carbonyl sulfide or nitrogen oxysulfide. Accordingly, the method of this invention requires two reaction stages: In the first reaction stage, hydrogen sulfide is supplied to the reaction device so as to be divided into sulfur and hydrogen under catalysis by the sulfide. In the second reaction stage, the sulfur deposited on the catalyst in the course of the first reaction stage is removed to regenerate the catalyst. Thereafter, the supply of hydrogen sulfide is resumed. Hydrogen sulfide can easily be divided into sulfur and hydrogen by repeating these two reaction stages as mentioned above.

The gas produced in the first reaction stage contains unaltered hydrogen sulfide in the form of a mixture with hydrogen gas. This mixed gas is treated by Girbotol process using alkanolamines, ADIP process using diisopropanolamines or some other known process so as to be separated into hydrogen and hydrogen sulfide. The unaltered hydrogen sulfide is circulated back to the reaction system. The recovered hydrogen is refined to an extent adequate to the intended use to which it is put.

Now, an explanation is made of the operation wherein hydrogen sulfide and carbon monoxide are simultaneously supplied to the reaction system in the presence of the aforementioned catalyst. When the aforesaid two reactions are allowed to proceed simultaneously, valuable carbonyl sulfide can be obtained as a by-product in conjunction with hydrogen as illustrated in the following reaction formula. Thus, the effective utilization of hydrogen sulfide can be enhanced all the more.

$$H_2S + CO \rightarrow H_2 + COS$$

In other words, a mixed gas of hydrogen and carbonyl sulfide is obtained by carrying out the decomposition reaction of hydrogen sulfide in the presence of the aforementioned metal sulfide catalyst and carbon monoxide. This mixed gas is stripped first of the unaltered hydrogen sulfide by Girbotol process or some other process and then of carbonyl sulfide by using organic solvents such as benzene, toluene, etc. The unaltered carbon monoxide and the separated hydrogen which are remaining in the form of a mixture are easily separated from each other and recovered independently by low-temperature processing, with the aid of a molecular sieve, or by some other suitable means. The unaltered gas is circulated back to the reaction system. In the operation in which nitrogen monoxide is supplied for regeneration of the deteriorated catalyst, nitrogen oxysulfide occurs in place of carbonyl sulfide mentioned above. Again in this case, the separation of hydrogen from the mixed gas may be accomplished by a suitable known method. In consideration of economy of operation and ease of handling, it is more desirable to use carbon monoxide for the regeneration of deteriorated catalyst. The amount of carbon monoxide or nitrogen monoxide to be supplied to the reaction system is sufficient when it is such that sulfur which would otherwise accumulate on the catalyst may be prevented from being deposited thereon. When the said gas is supplied in an excess amount, the operation is not inconvenienced so long as the gas is circulated to the reaction system.

When carbon monoxide or nitrogen monoxide is supplied to the reaction system simultaneously with hydrogen sulfide as mentioned above, carbonyl sulfide or nitrogen oxysulfide is obtained as a by-product in conjunction with hydrogen and the reaction itself can be carried out continuously. Thus, such simultaneous supply as mentioned above proves highly advantageous.

In practicing the method of this invention, there is not involved any particularly difficult technical problem. Hydrogen can easily be produced from hydrogen sulfide at relatively low reaction temperatures in the range of from normal room temperature to 500°C.

If the method of this invention is combined with the conventional hydrodesulfurization process such as is employed for the desulfurization of crude oil or heavy oil, then the hydrogen sulfide occurring as a by-product from the desulfurization process will be converted into hydrogen gas by the method of this invention and the hydrogen gas thus obtained will be circulated to the desulfurization process. Thus, the combined operation can markedly heighten the economy of the said hydrodesulfurization process. When the method of this invention is practiced in the form of a combination of processes, the operation results in removal of the noxious gas which is contained in the off gas discharged from the desulfurization equipment and which forms one cause of pollution. Thus, such combination of processes proves to be highly advantageous from the standpoint of industrial operation.

The following preferred embodiments are intended to describe this invention in further detail but should not be regarded as limitative of the present invention in any way.

EXAMPLE 1

A normal pressure flow type reactor was packed with 3.1g of an uncarried, i.e. unsupported, cobalt sulfide catalyst. With the catalyst kept at about 250°C, hydrogen sulfide was supplied at a flow volume of 44.6 cm$^3$/min. for 100 minutes to cause reaction. The effluent gas from the outlet was collected in its whole volume. The collected gas was analyzed by a gas chromatograph. The total volume of each component of the effluent gas was calculated on the basis of the results of analysis. The volumes thus calculated are shown below:

| Hydrogen sulfide | 4254 cm$^3$ | Carbonyl sulfide | 0 |
| Hydrogen | 206 cm$^3$ | Carbon monoxide | 0 |

In the course of the reaction, elution of elemental sulfur was not observed to occur. It is only logical to conclude that the whole volume of sulfur produced in consequence of the decomposition of hydrogen sulfide was deposited and accumulated on the surface of the catalyst. In the aforesaid reaction, the amount of hydrogen formed reached the maximum level about 10 minutes after the flow of hydrogen sulfide supply had been started, so that the hydrogen content in the effluent gas rose as high as 14%. Thereafter, the amount of formed hydrogen decreased as the surface of catalyst was gradually covered with sulfur. The hydrogen content in the effluent gas fell to nearly 0 after 100 minutes of reaction.

After the reaction for hydrogen formation was terminated, hydrogen sulfide in the reaction system was replaced with argon. Then, carbon monoxide was supplied to the reaction system at a flow volume of 98.8 cm$^3$/min. for 50 minutes while the reaction system was kept at 250°C. The effluent gas produced by the ensuring reaction was collected in its whole volume. The total amount of each component of the effluent gas was found to be as follows:

| Carbon monoxide | 4723 cm$^3$ | Hydrogen sulfide | 0 |
| Carbonyl sulfide | 217 cm$^3$ | Hydrogen | 0 |

In this reaction, the amount of carbonyl sulfide produced reached the maximum level about one minute after the flow of carbon monoxide had been started. It fell to nearly 0 after 50 minutes of reaction. This change in the amount of produced carbonyl sulfide represented the process in which the sulfur deposited on the surface of catalyst was removed in the form of carbonyl sulfide.

From the example described above, it is evident that in the first stage of reaction, hydrogen sulfide was decomposed to produce hydrogen and liberate sulfur as shown by the following formula, that the freed sulfur was accumulated on the surface of catalyst and that the decomposition of hydrogen sulfide ceased when the surface of catalyst was wholly covered by sulfur.

$H_2S$ + Catalyst → $H_2$ + S-Catalyst

In the second stage of reaction the sulfur deposited on the catalyst was removed in the form of carbonyl sulfide as shown by the following formula, with the result that the catalyst was regenerated.

S-Catalyst + CO → COS + Catalyst

The first and second stages of reaction were repeated nine more times. In each cycle of reaction, the aforesaid results were reproduced satisfactorily.

EXAMPLE 2

A normal pressure flow type reactor was packed with 4.24g of uncarried molybdenum disulfide. The molybdenum disulfide was heated to and kept at 380°C. To this reactor was supplied a flow of mixed gas consisting of 8.3 cm$^3$/min. of hydrogen sulfide and 18.4 cm$^3$/min. of carbon monoxide. After the reaction had reached a constant condition, the effluent reaction gas was found to have the following composition.

| Hydrogen 9.2% by volume | Carbon monoxide 59.3% by volume |
| Carbonyl sulfide 9.5% by volume | Hydrogen sulfide 22.0% by volume |

From the analyses shown above, it is seen that the conversion of hydrogen sulfide in this reaction was 29.3%. Since the equilibrated conversion at the reaction temperature indicated in this example is 38.5%, the reaction ratio of hydrogen sulfide in this case is found by calculation to have been 76% of the theoretical value.

EXAMPLE 3

The procedure of Example 2 was repeated, except that 1.6g of uncarried, i.e. unsupported, nickel sulfide was used as a catalyst. The reaction gas obtained consequently at the outlet of the reactor was found to have the following composition:

| Hydrogen | 5.8% by volume | Carbon monoxide | 62.5% |
| Carbonyl sulfide | 6.2% by volume | Hydrogen sulfide | 25.5% |

The analyses indicate that the conversion of hydrogen sulfide in this example was 18.4%. Since the theoretical conversion at the indicated temperature is 38.5%, the reaction ratio is found by calculation to have been 47.8% of the theoretical value.

EXAMPLE 4

A normal pressure flow type reactor was packed with 3.16g of a catalyst system having tungsten oxide and nickel oxide deposited on a silica-alumina carrier (tungsten content 20% and nickel content 6% respectively of the whole carried catalyst system). The catalyst was preparatorily sulfided by delivering the flow of hydrogen sulfide to the catalyst system while the latter was maintained by heating at 400°C. The sulfided catalyst was then maintained at 300°C and the flow of a mixed gas consisting of 44.6 cm$^3$/min. of hydrogen sulfide and 98.8 cm$^3$/min. of carbon monoxide was supplied thereto for reaction. The reaction gas obtained consequently at the outlet of the reactor was found to have the following composition:

| | |
|---|---|
| Hydrogen | 11.4% by volume |
| Carbonyl sulfide | 11.4% by volume |
| Carbon monoxide | 57.4% by volume |
| Hydrogen sulfide | 19.8% by volume |
| Carbon dioxide and others | 1.6% by volume |

The conversion of hydrogen sulfide in this example was 36.3%. Since the theoretical conversion at the indicated temperature is 41.0%, the reaction ration in this case is found by calculation to have been 88.5% of the theoretical value.

The same reactor as mentioned above was packed with 4.5g of copper oxide in place of the aforementioned tungsten/nickel catalyst. The catalyst was preliminarily sulfided. Thereafter, the mixed gas of hydrogen sulfide and carbon monoxide was supplied under entirely the same conditions as described above. The reaction gas obtained consequently was found to have the same composition as that of the feed gas. Neither hydrogen nor carbonyl sulfide was found to be formed in this operation at all.

EXAMPLE 5

A normal pressure flow type reactor was packed with 2.94g of an uncarried, i.e. unsupported, cobalt sulfide catalyst. The catalyst was heated to and maintained at 300°C. To this reactor, the flow of a mixed gas consisting of 29.3 cm³/min. of hydrogen sulfide and 65.1 cm³/min of carbon monoxide was supplied for reaction. The effluent gas obtained consequently at the outlet of the reactor was found to have the following composition:

| | |
|---|---|
| Hydrogen | 9.8% by volume |
| Carbonyl sulfide | 9.9% by volume |
| Carbon monoxide | 58.9% by volume |
| Hydrogen sulfide | 21.4% by volume |

The conversion of hydrogen sulfide in this example was 31.3%. Since the theoretical conversion at the indicated temperature is 41.0%, the reaction ratio in this case is found by calculation to have been 76.3% of the theoretical value.

The same reactor as mentioned above was packed with zinc sulfide in place of cobalt sulfide. The same mixed gas of hydrogen sulfide and carbon monoxide was treated by using this reactor under the same conditions. The effluent gas obtained at the outlet of the reactor was found to have entirely the same composition as that of the feed gas. Neither hydrogen nor carbonyl sulfide was found to occur in this operation at all.

When the same procedure was repeated by using manganese sulfide in place of cobalt sulfide, the effluent gas was found to contain traces of hydrogen and carbonyl sulfide.

EXAMPLE 6

The flow of a mixed gas consisting of 4.4 cm³/min of hydrogen sulfide and 9.8 cm³/min of a carbon monoxide was supplied onto 2.94g of an uncarried, i.e. unsupported, cobalt sulfide catalyst heated to 170°C. The reaction gas obtained consequently at the outlet of the reactor was found to have the following composition:

| | |
|---|---|
| Hydrogen | 12.7% by volume |
| Carbonyl sulfide | 12.7% by volume |
| Carbon monoxide | 55.5% by volume |
| Hydrogen sulfide | 19.2% by volume |

The conversion of hydrogen sulfide in this example was 40.8%. Since the theoretical conversion at the indicated temperature is 46.6%, the reaction ratio in this case is found by calculation to have been 87.6% of the theoretical value.

EXAMPLE 7

The flow of a mixed gas consisting of 29.3 cm³/min of hydrogen sulfide and 65.1 cm³/min of carbon monoxide was supplied onto 3.23g of an uncarried, i.e. unsupported, iron sulfide catalyst heated at 380°C. The reaction gas obtained consequently at the outlet of the reactor was found to have the following composition:

| | |
|---|---|
| Hydrogen | 7.4% by volume |
| Carbonyl sulfide | 7.4% by volume |
| Carbon monoxide | 61.3% by volume |
| Hydrogen sulfide | 23.9% by volume |

The conversion of hydrogen sulfide in this example was 23.6%. Since the theoretical conversion at the indicated temperature is 38.5%, the reaction ratio in this case is found by calculation to have been 61.3% of the theoretical value.

EXAMPLE 8

The procedure of Example 7 was reported, except that the flow of a mixed gas consisting of 4.4 cm³/min of hydrogen sulfide and 9.8 cm³/min of carbon monoxide was used as the feed gas. The reaction gas consequently obtained at the outlet of the reactor was found to have the following composition:

| | |
|---|---|
| Hydrogen | 10.5% by volume |
| Carbonyl sulfide | 10.5% by volume |
| Carbon monoxide | 58.2% by volume |
| Hydrogen sulfide | 20.8% by volume |

The conversion of hydrogen sulfide in this example was 33.7%. Since the theoretical conversion at the indicated temperature is 38.5%, the reaction ratio in this case is found by calculation to have been 87.5%.

EXAMPLE 9

The flow of a mixed gas consisting of 29.3 cm³/min of hydrogen sulfide and 65.1 cm³/min of carbon monoxide was supplied onto 3.00g of an uncarried, i.e. unsupported, chromium sulfide catalyst heated to 330°C. The reaction gas obtained consequently at the outlet of the reactor was found to have the following composition:

| | |
|---|---|
| Hydrogen | 6.3% by volume |
| Carbonyl sulfide | 6.7% by volume |
| Carbon monoxide | 62.0% by volume |
| Hydrogen sulfide | 25.0% by volume |

The conversion of hydrogen sulfide in this example was 20.0%. Since the theoretical conversion at the indicated temperature is 39.9%, the reaction ratio in this case is found by calculation to have been 50.1% of the theoretical value.

EXAMPLE 10

The procedure of Example 9 was repeated, except that the flow of a mixed gas consisting of 4.4 cm³/min of hydrogen sulfide and 9.8 cm³/min of carbon monoxide was used as the feed gas. The reaction gas obtained consequently at the outlet of the reactor was found to have the following composition:

| | |
|---|---|
| Hydrogen | 10.7% by volume |
| Carbonyl sulfide | 10.7% by volume |
| Carbon monoxide | 58.0% by volume |
| Hydrogen sulfide | 20.6% by volume |

The conversion of hydrogen sulfide in this example was 34.5%. Since the theoretical conversion at the indicated temperature is 39.9%, the reaction ratio in this case is found by calculation to have been 86.5% of the theoretical value.

EXAMPLE 11

The flow of a mixed gas consisting of 18.4 cm³/min of hydrogen sulfide and 8.3 cm³/min of carbon monoxide was supplied onto 2.94g of an uncarried, i.e. unsupported, cobalt sulfide catalyst heated at 200°C. The reaction gas obtained consequently at the outlet of the reactor was found to have the following composition:

| | |
|---|---|
| Hydrogen | 11.4% by volume |
| Carbonyl sulfide | 11.4% by volume |
| Carbon monoxide | 19.8% by volume |
| Hydrogen sulfide | 57.4% by volume |

The conversion of hydrogen sulfide in this example was 16.6%. Since the theoretical conversion at the indicated temperature is 20.0%, the reaction ratio in this case is found by calculation to have been 83.2% of the theoretical value.

EXAMPLE 12

The flow of a mixed gas consisting of 3.6 cm³/min of hydrogen sulfide and 8.0 cm³/min of carbon monoxide was supplied onto 3.00g of vanadium sulfide catalyst heated to 350°C. The reaction gas obtained consequently at the outlet of the reactor was found to have the following composition:

| | |
|---|---|
| Hydrogen | 7.5% by volume |
| Carbonyl sulfide | 7.7% by volume |
| Carbon monoxide | 43.3% by volume |
| Hydrogen sulfide | 41.5% by volume |

The conversion of hydrogen sulfide in this example was 15.3%. Since the theoretical conversion at the indicated temperature is 39.3%, the reaction ratio is found by calculation to have been 38.9% of the theoretical value.

We claim:

1. A method for the manufacture of hydrogen and carbonyl sulfide from hydrogen sulfide and carbon monoxide, which comprises continuously supplying under normal pressure flow a mixed gas of hydrogen sulfide and carbon monoxide to a reaction vessel packed with a catalyst selected from the group consisting of vanadium sulfide, chromium sulfide, molybdenum sulfide, tungsten sulfide, iron sulfide, cobalt sulfide, nickel sulfide, rhodium sulfide, palladium sulfide and platinum sulfide, said catalyst temperature being between room temperature and a temperature not higher than 500°C., thereby producing hydrogen and carbonyl sulfide from said hydrogen sulfide and carbon monoxide in said reaction vessel, continuously discharging a mixture of hydrogen, carbonyl sulfide, nonreacted hydrogen sulfide and carbon monoxide from said reaction vessel, and separating said hydrogen and carbonyl sulfide from the discharged gas.

2. The method set forth in claim 1, wherein the reaction vessel is initially packed with one member selected from the group consisting of vanadium oxide, chromium oxide, molybdenum oxide, tungsten oxide, iron oxide, cobalt oxide, nickel oxide, rhodium oxide, palladium oxide and platinum oxide, prior to supplying hydrogen sulfide to said reaction vessel, whereby said oxide is converted into sulfide.

3. The method set forth in claim 1, wherein the nonreacted hydrogen sulfide and carbon monoxide discharged from the reaction vessel are continuously returned to said reaction vessel.

* * * * *